Nov. 27, 1951     C. A. WENDEL     2,576,737
AUTOMATIC FLUID SAMPLING DEVICE
Filed Jan. 31, 1949     2 SHEETS—SHEET 1

Clifford A. Wendel
INVENTOR.

BY *Clarence A. O'Brien
and Harvey B. Jacobson*
Attorneys

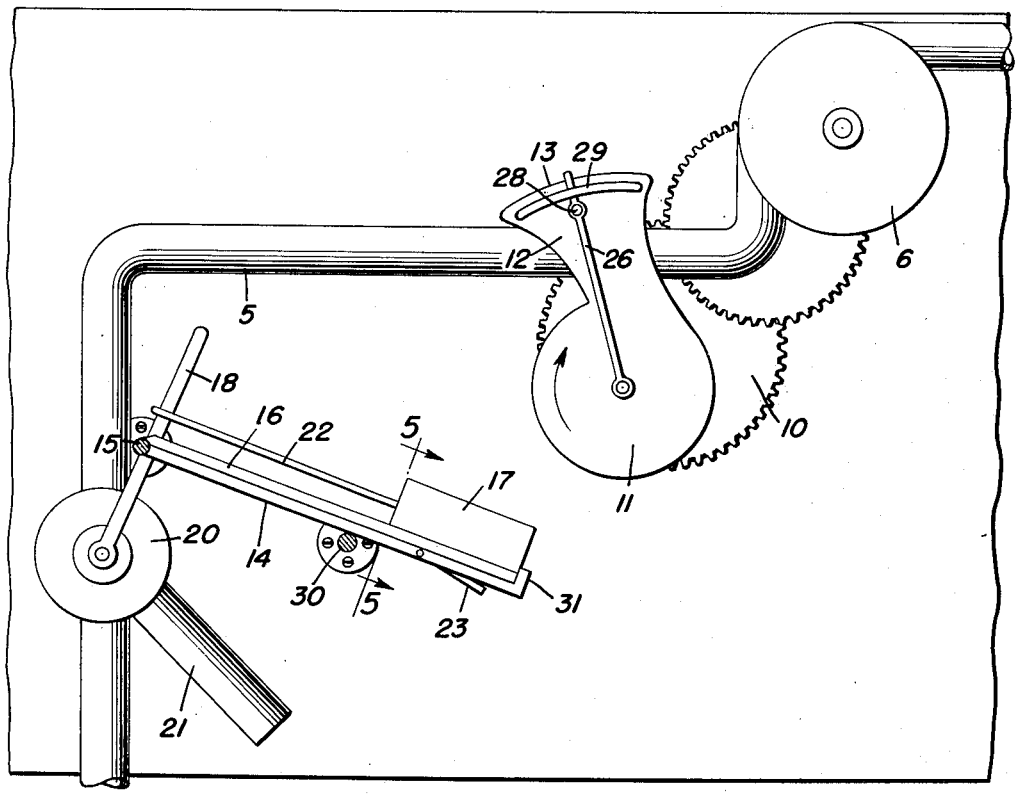
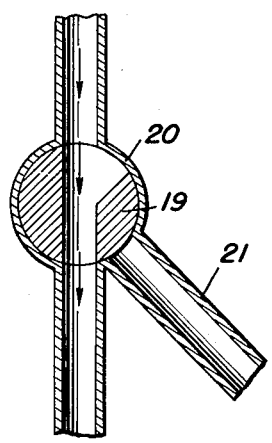
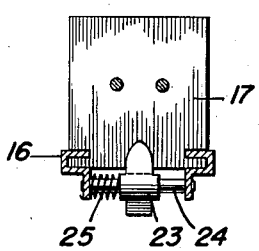

Patented Nov. 27, 1951

2,576,737

UNITED STATES PATENT OFFICE 2,576,737

AUTOMATIC FLUID SAMPLING DEVICE

Clifford A. Wendel, Butte, Mont.

Application January 31, 1949, Serial No. 73,764

7 Claims. (Cl. 73—422)

1

The present invention relates to new and useful improvements in apparatus operated by the movement or flow of fluid for automatically obtaining a sample from a flowing stream, such as sludge produced by diamond drilling, or for taking samples of oil, mill tailings, or slimes, and other liquids and suspensions of solids in liquids.

An important object of the invention is to provide a sampling apparatus whereby a truly representative or accurate sample may be obtained from a given quantity of moving or flowing liquid.

A further object is to provide means for obtaining samples of flowing liquids whereby samples are obtained in accurate or direct proportions of the volume or rate or flow of the liquid.

Another object of invention is to provide means for automatically obtaining samples at regular intervals from fluid passing through a pipe or conduit.

A still further object is to provide a branch pipe leading from a main pipe or conduit through which liquid is flowing and providing an automatically operated valve for diverting a predetermined quantity of the liquid to the branch pipe and at the same time cutting off the main pipe.

Another object is to provide an apparatus of this character of simple and practical construction, which is efficient and reliable in operation, relatively inexpensive to manufacture and otherwise well adapted for the purposes for which the same is intended.

Other objects and advantages reside in the details of construction and operation as more fully hereinafter described and claimed, reference being had to the accompanying drawings forming part hereof, wherein like numerals refer to like parts throughout, and in which:

Figure 2 is a similar view showing the valve operating mechanism in a position following completion of a sample taking cycle;

Figure 4 is a vertical sectional view of the control valve, and

Figure 5 is a fragmentary sectional view taken on a line 5—5 of Fig. 2.

Figure 1:
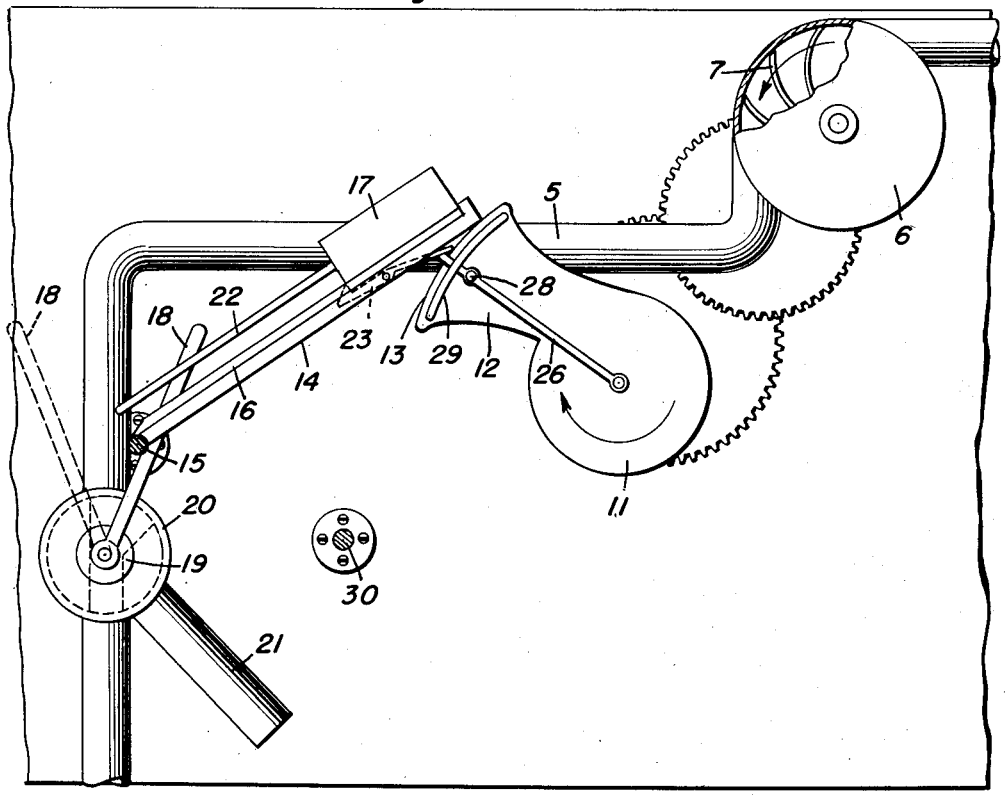
Figure 1 is a side elevational view of the sampling apparatus with parts broken away and shown in section and with the valve operating mechanism prior to being released for taking a sample.
Figure 3:
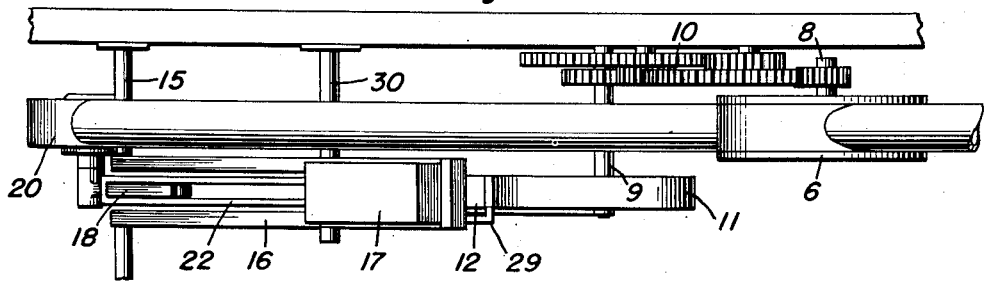
Figure 3 is a top plan view.

Referring now to the drawings in detail wherein for the purpose of illustration I have disclosed a preferred embodiment of the invention, the numeral 5 designates a pipe or conduit for the liquid from which a sample is to be taken.

2

A fluid operated wheel or turbine of a conventional construction is enclosed in a housing 6 with the blades 7 of the wheel in the path of the flowing stream of liquid, the wheel turning a shaft 8 projecting outwardly from the housing 6 and is operatively connected to a shaft 9 by means of a suitable gearing 10. The gearing 10 includes a plurality of meshing gears suitable for reducing the speed of rotation of shaft 9 and the ratio of the gearing may be changed in accordance with the requirements.

A wheel 11 is secured to shaft 9 and is formed with a radially extending arm or cam 12 having an arcuate outer edge 13 positioned for riding under the free or outer end of a platform 14 which is pivoted at its inner end on suitable horizontal supports 15 for vertical swinging movement of the platform.

The platform 14 includes a pair of spaced parallel tracks or channel shaped guides 16 in which the lower edge of a weighted block or body 17 is slidably supported for longitudinal sliding movement on the platform.

Projecting upwardly between the tracks 16 is a lever 18 suitably connected at its lower end to one end of a conventional rotary valve 19 working in a housing 20 suitably connected in the pipe line 5. A branch pipe 21 leads from the pipe line at its junction with the housing 20, the valve being constructed for cutting off the pipe line 5 and connecting the branch pipe 21 therewith and cutting off the branch pipe and restoring the pipe line by opposite rotary movement of the valve.

A U-shaped wire loop 22 projects outwardly from the body 17 and is looped over the lever 18.

A trip or catch 23 is pivoted on a pin 24 supported between the guides 16 and is provided with a spring 25 holding the front end of the catch upwardly in engagement with the body 17.

The rear end of catch or trip 23 is positioned in the path of the outer end of a trip release arm 26 positioned at one side of arm or cam 12 and pivoted at its inner end to the arm 12, as shown at 27. The free end of trip release arm 26 projects outwardly beyond arm 12 and is secured in pivotally adjusted position with respect to the leading or trailing edge of arm 12 by a set screw 28. The arm 26 works in a guide 29 secured to the arm 12 to limit movement of the arm 26.

In the operation of the device, the fluid operated wheel 7 is positioned in a pipe or conduit 5 for operation by the flow of liquid therein and drives wheel 11 to rotate arm 12 through the gearing 10. During the greater portion of rotation of wheel 11 and arm 12 the platform 14 rests on a stop 30 in a downwardly inclined position to slide body 17 rearwardly against a stop 31 at the rear end of the platform as shown in Figure 2 and is held in that position by catch 23. In this position of the platform 14 the loop 22 pulls lever 18 in a direction to cut off branch or sampling pipe 21 by valve 19 while pipe 5 remains open.

As arm 12 swings under platform 14, the platform is raised, and trip release arm 26 carried by arm 12 releases catch 23 to free body 17 which then slides forwardly on platform 14 to strike lever 18 and swing the lever into a position shown by the dotted lines in Figure 1 to cut off pipe 5 and divert the liquid to branch pipe 21 by valve 19 which thus discharges a predetermined quantity of the liquid into a suitable tank or container for taking a sample of the liquid.

In view of the foregoing description taken in conjunction with the accompanying drawings it is believed that a clear understanding of the device will be quite apparent to those skilled in this art. A more detailed description is accordingly deemed unnecessary.

It is to be understood, however, that even though there is herein shown and described a preferred embodiment of the invention the same is susceptible to certain changes fully comprehended by the spirit of the invention as herein described and the scope of the appended claims.

Having described the invention, what is claimed as new is:

1. A sampling mechanism for pipe lines comprising the combination of a pipe having a branch, a valve diverting liquid from the pipe to the branch, and operating means for the valve and including a rotor operated by fluid flowing in the pipe, a cam operated by the rotor, an operating lever for the valve, a vertically swingable member controlled by the cam, and a gravity actuated slide on the swingable member engaged with the lever for actuating the latter in an opening and closing movement.

2. A sampling mechanism for pipe lines comprising the combination of a pipe having a branch, a valve diverting liquid from the pipe to the branch, and operating means for the valve and including a rotor operated by fluid flowing in the pipe, a cam operated by the rotor, an operating lever for the valve, a vertically swingable member controlled by the cam, a gravity actuated slide on the swingable member engaging the lever for actuating the latter in an opening and closing movement, and a trip device for the slide controlled by said cam.

3. A sampling mechanism for pipe lines comprising the combination of a pipe having a branch, a valve diverting liquid from the pipe to the branch, and operating means for the valve and including a rotor operated by fluid flowing in the pipe, a cam operated by the rotor, a trip release arm carried by the cam, an operating lever for the valve, a vertically swingable member controlled by the cam, a gravity actuated slide on the swingable member engaging the lever for actuating the latter in an opening and closing movement, and a trip device for the slide controlled by said trip release arm.

4. A sampling mechanism for pipe lines comprising the combination of a pipe having a branch, a valve diverting liquid from the pipe to the branch, and operating means for the valve and including a rotor operated by fluid flowing in the pipe, a cam operated by the rotor, a trip release arm carried by the cam, an operating lever for the valve, a vertically swingable track in the path of the cam for raising the track, said track gravitating into its lower position, a carriage slidably mounted on the track and gravitating toward each end of the track, a catch holding the carriage at the outer end of the track and including a trip disposed in the path of the trip release arm for releasing the catch, and means connecting the carriage to the lever to move the same into its open and closed positions upon an opposite movement of the carriage.

5. A sampling mechanism for pipe lines comprising the combination of a pipe having a branch, valve means for diverting material from the pipe to the branch, a support, operating means for the valve means including a cam rotatably mounted on said support, means for rotating said cam, a trip release arm pivotally attached to said cam, means for selectively locking said release arm to said cam in a predetermined angularly adjusted position, an operating lever for said valve means, a vertically swingable track disposed in the path of movement of said cam to be elevated thereby, said track gravitating into its lower position, a carriage slidably mounted on the track and gravitating toward each end of said track, a catch holding said carriage at the outer end of the track, said trip release arm engaging said catch to release said carriage as said cam rotates, and means connecting said carriage to said lever to move said lever into its open and closed position upon opposite movement of said carriage.

6. A sampling mechanism for pipe lines comprising the combination of a pipe having a branch, valve means for diverting fluid from the pipe to the branch, cam means, means for actuating said cam means, an operating lever attached to said valve, a vertically swingable guide member disposed in the path of movement of said cam means to be elevated thereby, and gravity actuated slide means on said swingable member engaged with said lever for actuating the latter in an opening and closing movement.

7. A sampling mechanism for pipe lines comprising a pipe having a branch, valve means for diverting fluid from said pipe to said branch, a support, guide means vertically pivotally attached to said support, cam means for raising the free end of said guide means above the pivot point thereof, means for actuating said cam means, a lever carried by said valve means, means slidably disposed on said guide means for actuating said lever to divert fluid into said branch, said last mentioned means being moved by gravity relative to said guide means in response to raising and lowering of the free end of said guide means relative to the pivot point thereof, trip means for retaining said slide means adjacent the free end of said guide means, and means carried by said cam means for releasing said trip means.

CLIFFORD A. WENDEL.

REFERENCES CITED

The following references are of record in the file of this patent:

UNITED STATES PATENTS

| Number | Name | Date |
|---|---|---|
| 470,489 | Henkel | Mar. 8, 1892 |
| 1,031,385 | Sheridan | July 2, 1912 |
| 1,691,687 | Watts | Nov. 13, 1928 |
| 2,272,313 | Waters | Feb. 10, 1942 |
| 2,461,045 | Fairbairn | Feb. 8, 1949 |